United States Patent [19]

Coburn, Jr. et al.

[11] Patent Number: 4,656,072

[45] Date of Patent: Apr. 7, 1987

[54] RETROREFLECTIVE MATERIAL FOR PROVIDING A COLORED DECORATIVE EFFECT IN VISIBLE LIGHT

[75] Inventors: Joseph W. Coburn, Jr., Lakewood; Trudy J. Bryson, Allentown, both of N.J.

[73] Assignee: Coburn Corporation, Lakewood, N.J.

[21] Appl. No.: 790,877

[22] Filed: Oct. 24, 1985

Related U.S. Application Data

[63] Continuation-in-part of Ser. No. 745,801, Jun. 17, 1985, abandoned, which is a continuation of Ser. No. 513,652, Jul. 14, 1983, abandoned.

[51] Int. Cl.$^4$ .................. B32B 23/02; D02G 3/00
[52] U.S. Cl. ........................ 428/40; 428/192; 428/200; 428/201; 428/913
[58] Field of Search .............. 428/913, 192, 40, 200, 428/201; 156/67, 308.4, 279

[56] References Cited

U.S. PATENT DOCUMENTS

| | | | |
|---|---|---|---|
| 232,965 | 10/1880 | Hastings | 428/192 X |
| 2,723,477 | 11/1955 | Markus et al. | 428/192 X |
| 2,948,191 | 8/1960 | Hodgson, Jr. et al. | 156/308.4 X |
| 3,012,918 | 12/1961 | Schaar | 428/192 X |
| 3,684,348 | 8/1972 | Rowland | 428/40 X |
| 3,936,567 | 2/1976 | Vesely | 428/40 X |
| 3,940,864 | 3/1976 | Karzelberger | 428/192 X |
| 4,075,049 | 2/1978 | Wood | 428/40 X |
| 4,419,436 | 12/1983 | Kranser | 428/40 X |
| 4,546,042 | 10/1985 | Quon | 156/67 X |

Primary Examiner—Nancy Swisher
Attorney, Agent, or Firm—R. Gale Rhodes, Jr.

[57] ABSTRACT

Retroreflective material, and articles of manufacture made therefrom and process of making the same, wherein the color of an underlying colored material, such as colored thermoplastic film, is visible, in visible light, through the portion of an overlying substantially clear material, such as clear thermoplastic film, which clear material is sealed such as by heat sealing, to the colored material, the sealing obliterates or removes the retroreflective surface intermediate the materials at the place of sealing making the color of the underlying colored material visible through the sealed portion; the retroreflectivity of the remaining intermediate retroreflective surface is undiminished. Upon the entire periphery of the overlying and underlying layers of material being sealed, the remaining retroreflective surface intermediate the layers is completely sealed against contamination and the retroreflectivity of the remaining intermediate surface is undiminished.

9 Claims, 14 Drawing Figures

RETROREFLECTIVE MATERIAL FOR PROVIDING A COLORED DECORATIVE EFFECT IN VISIBLE LIGHT

CROSS REFERENCE TO RELATED APPLICATIONS

This application is a continuation-in-part of pending U.S. patent application Ser. No. 745,801 filed June 17, 1985, now abandoned, which is a continuation of U.S. patent application Ser. No. 513,652 filed July 14, 1983 (abandoned in favor of continuation application Ser. No. 745,801).

FIELD OF THE INVENTION

This invention relates generally to new and improved retroreflective material for providing a colored decorative effect in visible light, and more particularly relates to retroreflective articles of manufacture provided with a colored decorative effect in visible light and processes for manufacturing the same.

BACKGROUND OF THE INVENTION

Various reflective materials are known to the prior art which materials, as known to those skilled in the art, reflect received light back along its original path and do not reflect received light at angles of reflection. Such retroreflective materials are typically used for night viewing in traffic signs, advertising signs, holiday decorations, labels and tags, window displays, arts and crafts, decorative decals, etc.

A major problem associated with typical prior art retroreflective material is that when viewed in visible light, i.e. sunlight, incandescent or fluorescent light, such material is substantially void of color and at best, so far as attractiveness to the eye is concerned, appears to be a dull and unattractive gray. Accordingly, articles of manufacture made from such prior art retroreflective material are also substantially void of color and therefore unattractive to the eye in visible light, and although such articles of manufacture are primarily for night viewing, the point of sale of such articles is typically the interior of a retail store illuminated by visible light where the articles appear unattractive to the eye of a potential purchaser. Colored retroreflective materials, of course, are known to the prior art but such colored retroreflective materials are typically made by placing colorants, such as coloring dyes and pigments, in a layer of clear plastic film provided with he retroreflective surface and such colorants have been found to substantially and therefore undesirably reduce the retroreflectivity of the material.

Still further, as known to those skilled in the retroreflective material art, the typical retroreflective surface is an extremely delicate surface which is easily contaminated by dirt, grease, moisture, fingerprints, etc. and delicate to the point that even minor contamination can cause substantial, and therefore undesirable, decreased retroreflectivity. The typical prior art solution for preventing such contamination is to metallize the retroreflective surface with a thin layer of metal such as aluminum or an aluminum alloy, however, as is known to those skilled in the art, such metallization also substantially, and therefore undesirably, reduces retroreflectivity.

Accordingly, there exists a need in the retroreflective material art for a retroreflective material which has or can be provided with a colored decorative effect in visible light which does not substantially reduce retroreflectivity whereby articles of manufacture made from the material will be provided with a colored decorative effect which will be attractive to the eye of the purchaser at the point of sale in visible light. Further, there exists a need for sealing the retroreflective surface against contamination which does not substantially reduce retroreflectivity.

SUMMARY OF THE INVENTION

The object of the present invention is to satisfy the foregoing needs in the retroreflective material art.

The present invention provides new and improved retroreflective material, and articles of manufacture made therefrom and process of making the same, wherein the color of an underlying colored material, such as colored thermoplastic film, is visible, in visible light, through the portion of an overlying substantially clear material, such as clear thermoplastic film, which clear material is sealed, such as by heat sealing, to the colored material, the heat sealing obliterates or removes the retroreflective surface intermediate the materials at the place of sealing making the color of the underlying colored material visible through the sealed portion; the retroreflectivity of the remaining intermediate retroreflective surface is undiminished. Upon the entire periphery of the overlying and underlying layers of material being sealed, the remaining retroreflective surface intermediate the layers is completely sealed against contamination and the retroreflectivity of the remaining intermediate surface is undiminished.

It will be understood by those skilled in the art that the term "colored decorative effect" as used in this specification and the appended claims means a colored effect or appearance which is viewable by the naked eye of a human being in visible light, i.e. sunlight, fluorescent or incandescent light.

DESCRIPTION OF THE PREFERRED EMBODIMENTS

Figures 1, 2:
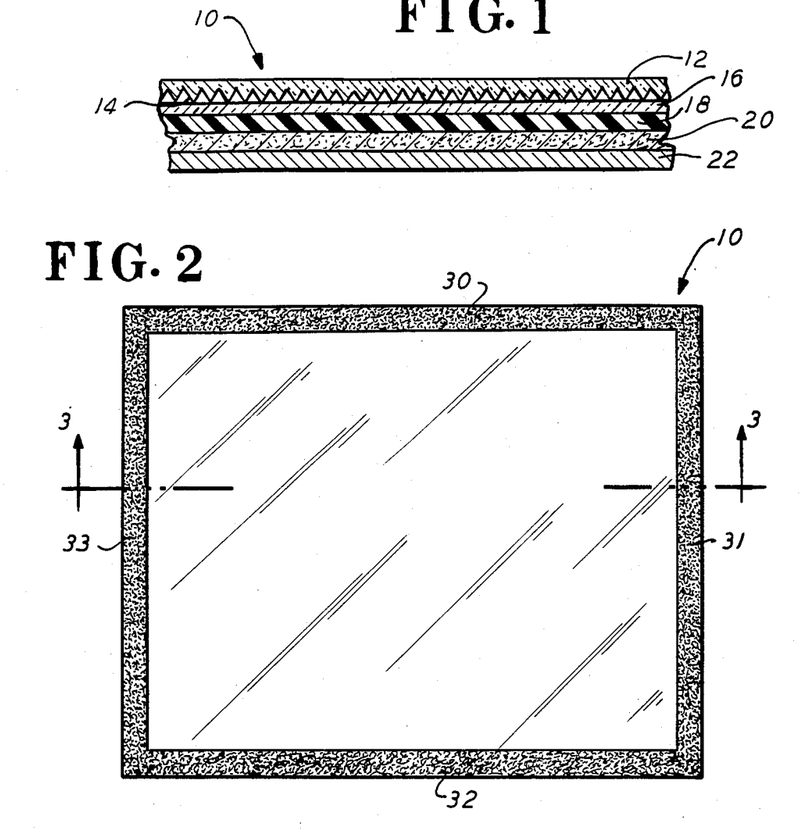
FIG. 1 is a partial diagrammatical elevational illustration of a cross-section of retroreflective material embodying the present invention.
FIG. 2 is a top elevational view of retroreflective material embodying the present invention.

Referring now to FIG. 1, there is shown diagrammatically and in vertical elevational cross-section a partial view of new and improved retroreflective material embodying the present invention and indicated generally by numerical designation 10. The material is thermally cuttable and for providing a colored decorative effect, particularly to articles of manufacture made therefrom as taught in detail below in accordance with the further teachings of the present invention. The retroreflective material 10 may include a top layer of substantially transparent thermoplastic film 12 whose bottom surface is provided with a suitable retroreflective surface 14, an intermediate layer of substantially transparent heat seal adhesive 16, and a bottom layer of colored thermoplastic film 18; if desired so as to permit the material 10 or articles of manufacture made therefrom to be adhered to other surfaces, the material 10 may further include a layer of suitable pressure sensitive adhesive 20 applied to the bottom surface of the layer of colored thermoplastic film 18 and a suitable release liner 22 covering the layer of pressure sensitive adhesive. The thermoplastic films 12 and 18 may be, for example, rigid polyvinylchloride, polycarbonate, acrylic, and equivalents; the retroreflective surface 14 may be any one of several such surfaces known to the art such as, for example, the retroreflective surface referred to in the art as a cubed corner retroreflective surface; the layer of substantially transparent heat seal adhesive 16 may be, for example, synthetic rubber, ethylene vinyl acetate, or the equivalent, and in the practice of the present invention the layer or coating of heat seal adhesive 16 is first coated onto the top surface of the layer of colored thermoplastic film 18 prior to assembly with the layer of substantially transparent thermoplastic film 12; and the pressure sensitive adhesive 20 and the release liner 22 may be any one of several known to the prior art and may be provided in accordance with well known teachings in such art. It will be further understood by those skilled in the art that the terms "top layer," intermediate layer, bottom layer, top and bottom surfaces," are used in the context of this specification merely for convenience of reference in describing the structure shown in the orientation of FIG. 1 and that such terms are merely relative terms for convenience of reference and that such terms bear no limiting relationship to the present invention as it will be readily recognized that the retroreflective material 10, and particularly articles of manufacture made therefrom, may be in actual use oriented at any orientation, for example horizontally, vertically, at an angle, upside down, etc.

Figure 3:
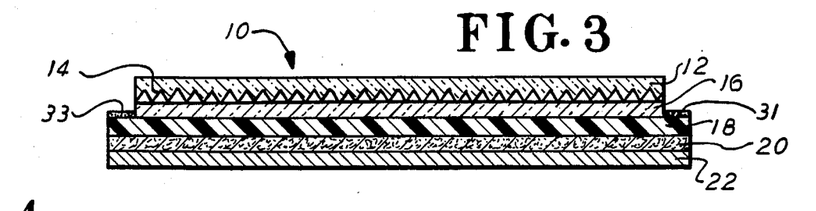
FIG. 3 is a cross-sectional view taken along the line 3—3 in FIG. 2 in the direction of the arrows.

Referring now to FIGS. 2 and 3, and in accordance with the further teachings of the present invention, the inwardly extending peripheral portions 30, 31, 32 and 33 of the top layer of substantially clear thermoplastic film 12 and bottom layer of colored thermoplastic film 18 are illustrated diagrammatically by the solid black border as being suitably heat sealed together through the substantially clear heat seal adhesive intermediate such peripheral portions; or viewed alternatively, the inwardly extending peripheral portions of the top layer of substantially clear thermoplastic film 12 are heat sealed through the intermediate layer of substantially clear heat seal adhesive 16 to the bottom layer of colored thermoplastic film 18. It will be understood that such heat sealing obliterates or removes the retroreflective surface 14 intermediate the heat sealed peripheral portions and the color of the bottom or underlying colored thermoplastic film 18 becomes visible through the heat sealed portions to provide the retroreflective material 10 with a colored periphery or border providing a decorative effect when viewed in visible light. Such heat sealing and provision of colored decorative effect does not diminish the retroreflectivity of the remaining retroreflective surface 14 residing interiorly of the heat sealed peripheral portions, and it will be further understood in accordance with the teaching of the present invention, that upon the sealing of the entire peripheral portions of the retroreflective material 10 the remaining retroreflective surface 14 residing interiorly of such sealed peripheral portions is sealed against contamination.

Figure 4:
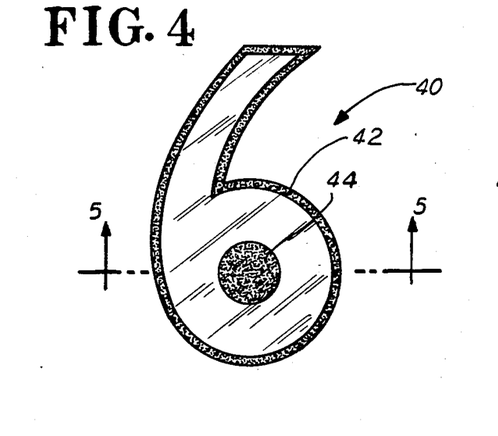
FIG. 4 is a top view of a diagrammatic illustration of a retroreflective article of manufacture embodying the present invention.
Figure 5:
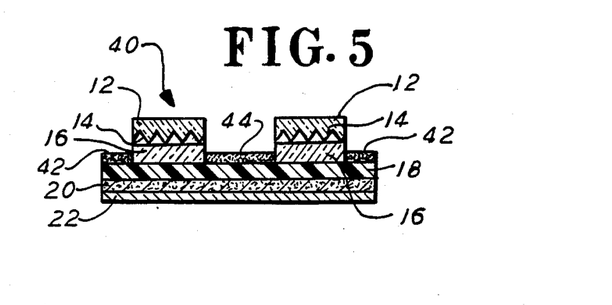
FIG. 5 is a cross-sectional view taken along the line 5—5 in FIG. 4 in the direction of the arrows.

Referring now to FIGS. 4 and 5, there is illustrated diagrammatically a retroreflective article of manufacture 40 in the shape of a figure six (6) which article may be manufactured from the retroreflective material 10 (FIGS. 1-3) in accordance with further process teachings of the present invention set forth below. The retroreflective article of manufacture 40 is provided with an inwardly extending heat sealed peripheral portion 42, indicated by the black border, and a heat sealed interior portion 44, indicated by the black circle in FIG. 4, which peripheral portion 42 and interior portion 44, are provided in the same manner taught above with regard to the inwardly extending peripheral portions 30, 31, 32, and 33 of FIGS. 2 and 3, and also provide a colored decorative effect in visible light without diminishing the retroreflectivity of the remaining retroreflective surface 14.

With specific regard to the process teachings of the present invention, the process of manufacturing the retroreflective article 40 of FIGS. 1-5 will now be set forth as an example. It will be presumed that the retroreflective material 10 (FIGS. 1-3) has been placed between the thermal die 50 of FIG. 6 with the support member 52 supporting the bottom of the retroreflective material 10 and with the layer of substantially clear thermoplastic material 12 facing the thermal die 50. The thermal die 50, shown in cross-section, will be shaped such that the thermal die edge 54 is in the shape of the outline of the retroreflective article of manufacture 40 of FIG. 4, i.e. in the shape of the outline of the figure six (6); the thermal die 50 also will be provided with an internal member 56 whose face 57 will be in the shape of the circular interior portion 44 of FIG. 4.

The thermal cutting die 50 will be advanced downwardly in the direction of the arrow 50 towards the support member 52 a distance sufficient to thermally cut the retroreflective article 40 in the shape of a figure six (6) out of the retroreflective material 10 and in so advancing, the effective transverse die surface 58 will apply heat and pressure to the opposed peripherally inwardly extending portions 42 (FIGS. 4 and 5) of the layer of substantially clear thermoplastic film 12 and layer of colored thermoplastic film 16 to heat seal such portions, as shown in FIG. 5, and to remove retroreflective surface 14 residing between such portions whereby the colored thermoplastic film 18 will be visible through the heat sealed peripheral portions 42 to provide a colored decorative effect in visible light; simultaneously, the thermal die member 56 will be advanced a sufficient distance toward the support member 52 to engage additional opposed portions of the layer of substantially clear thermoplastic film 12 and colored thermoplastic film 18 to apply heat and pressure to the additional portions, seal these portions, remove the retroreflective surface 14 residing therebetween, and to provide the interior portion 44 indicated by the black circle in FIG. 4 whereby the colored thermoplastic film 16 underlying such opposed portions will be visible through the heat seal to provide an additional colored decorative effect in visible light. Thus, it will be understood that upon a potential purchaser viewing the retroreflective article of manufacture 40 of FIG. 6 in visible light such as typically found in the interior of a retail store, the customer will see a retroreflective article of manufacture having a colored border 42 and a colored interior 44 defining the shape of the figure six (6) in color; however, upon the retroreflective article of manufacture 40 being placed in the dark and receiving light, the retroreflective surface 14 underlying the layer of substantially clear thermoplastic film 12 and not covered by the heat sealed peripheral portion 42 and interior circle 44, will retroreflect the received light in the shape or configuration of the figure six (6). In one embodiment of the manufacturing process of the present invention, the pressure applied by the thermal die 50 was from 2-3 psi and the heat applied was from 150° F.-250° F.

Figures 6, 7:
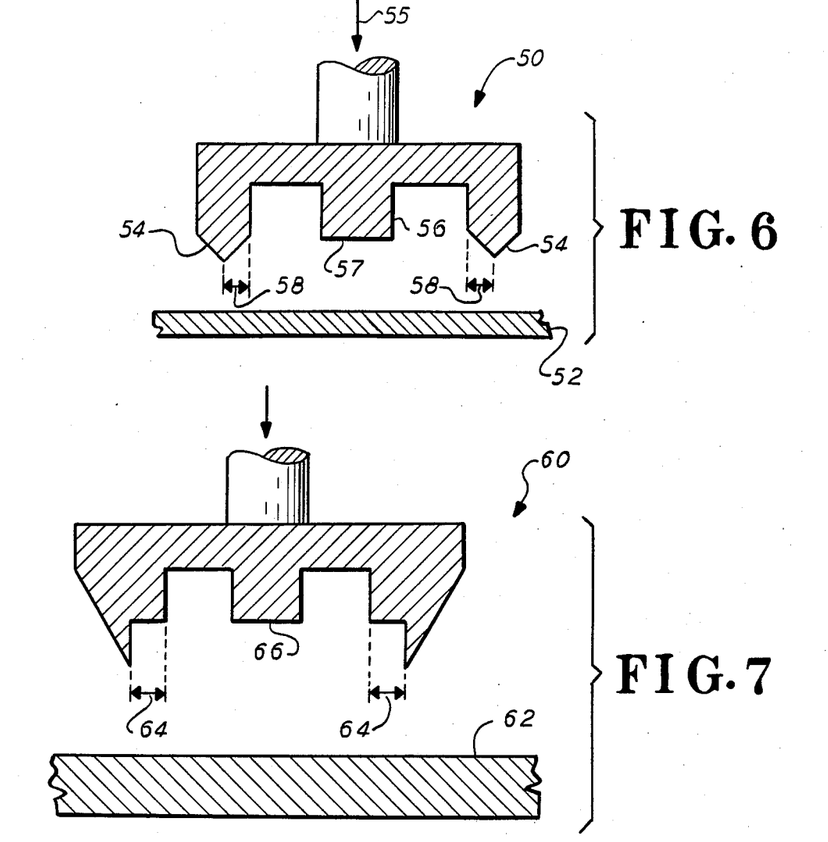
FIGS. 6, 7 and 8 are diagrammatical illustrations of thermal and dielectric heating dies which may be used to practice the manufacturing processes of the present invention.

Alternatively, the manufacturing process of the present invention may be performed utilizing the thermal die 60 and support member 62 of FIG. 7. In this embodiment, the manufacturing process is substantially identical to that described with regard to the teaching in connection with FIG. 6; however, the thermal die 60, instead of having an effective transverse surface 58 as did the thermal die 50 of FIG. 6, is provided with an actual transverse surface 64 which performs the same function as the effective transverse surface 58 of the thermal die 50; otherwise, the manufacturing process of the present invention utilizing the thermal die 60 of FIG. 7 is identical to that taught in connection with thermal die 50 of FIG. 6.

Figure 8:
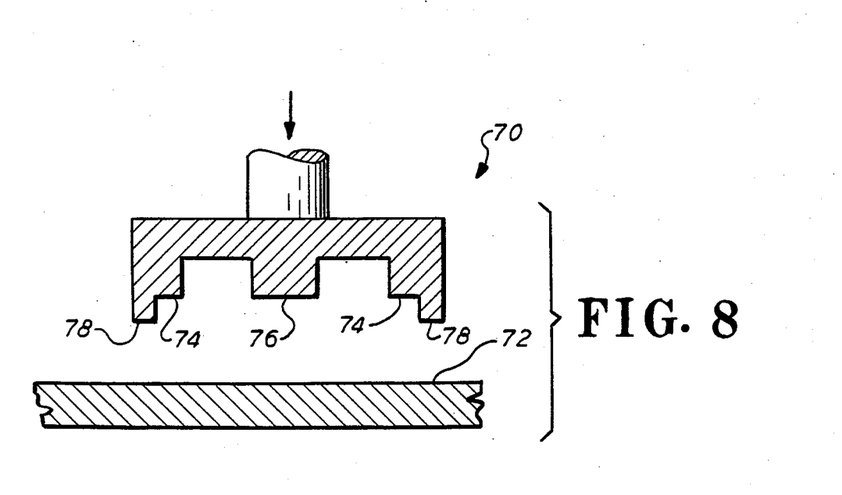

Further alternatively, the manufacturing process of the present invention may be practiced using the dielectric heating die 70 of FIG. 8 and the support member 72. Dielectric heating, as known to those skilled in the art, is the rapid and uniform heating throughout a non-conducting material, such as thermoplastic material, by means of a high frequency electromagnetic field; accordingly, it will be understood that the dielectric heating die 70 of FIG. 8 performs such dielectric heating in this alternate manufacturing process of the present invention. It will be noted that the dielectric heating die 70 is provided with an inner peripheral transverse surface 74 and an outer peripheral transverse surface 78 lower than the inner surface 74. Thus, upon the dielectric heating die 70 advancing towards the support member 72 with the retroreflective material 10 (FIGS. 1-3) therebetween, the die will be advanced downwardly sufficiently to cause the outer peripheral transverse surface 78 to apply sufficient dielectric heat and pressure to the opposed peripheral portions 42 of the layer of substantially clear thermoplastic material 12 and layer of colored thermoplastic material 16, to cause such opposed portions to reduce in thickness and in strength to permit the opposed portions to be broken away from the outer and remaining portion of the retroreflective material 10 and provide the article of manufacture 40; simultaneously, the inner peripheral transverse surface 74 and internal member 76 will engage respective opposed portions of the layer of substantially transparent thermoplastic material 12 and layer of colored thermoplastic film 16 to heat seal and provide the peripheral and interior portions 42 and 44 of FIGS. 4 and 5 providing the colored decorative effects as taught above.

Of course, it will be understood that to provide the retroreflective article of manufacture 40 of FIG. 4 that the thermal die 60 of FIG. 7 and dielectric heating die 70 of FIG. 8 will also be in the shape of the figure six (6). Retroreflective articles of manufacture of different shapes may be provided by the manufacturing processes of the present invention by shaping the thermal or dielectric heating dies accordingly.

Figure 9:
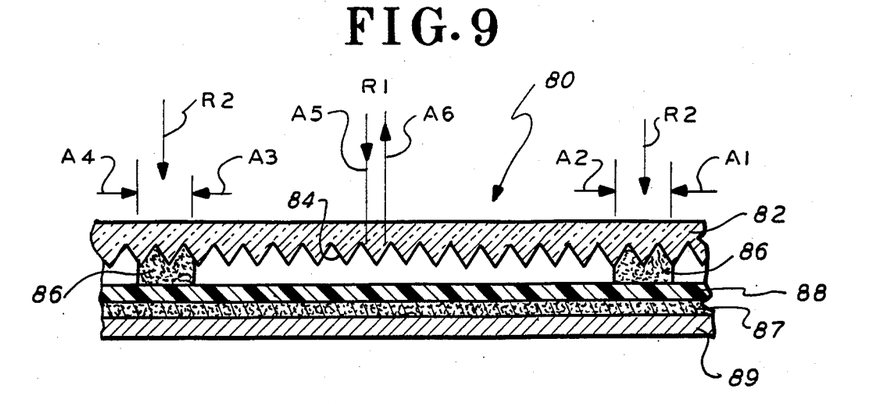
FIGS. 9, 10 and 11 are partial diagrammatical elevational illustrations of a cross-section of alternate embodiments of retroreflective material embodying the present invention.
Figure 10:
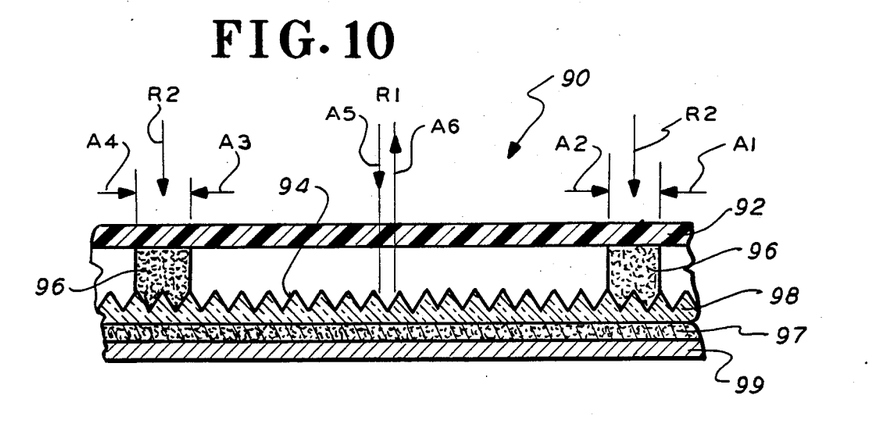

Referring now to FIGS. 9 and 10, there are shown, diagrammatically and in vertical elevational cross-section, partial views of alternate embodiments of new and improved retroreflective materials for providing a colored decorative effect in visible light and embodying the present invention, such materials are indicated respectively by general numerical designations 80 and 90; new and improved retroreflective articles of manufacture providing a colored decorative effect in visible light and embodying the present invention may be manufactured from materials 80 and 90 in accordance with the processes of manufacture of the present invention.

Retroreflective material 80, FIG. 9, may include a top layer of substantially transparent material, such as a suitable transparent thermoplastic film, whose bottom surface is provided with a suitable retroreflective surface 84; an intermediate layer of colored adhesive 86, such as a suitable colored pressure sensitive adhesive or a suitable colored heat sensitive adhesive; a lower or bottom layer of suitable material 88, such as a layer of suitable thermoplastic film; and if desired so as to permit the material 80 or articles of manufacture made therefrom to be adhered to other surfaces, a further layer of suitable pressure sensitive adhesive 87 and a suitable release liner 89 covering the layer of pressure sensitive adhesive may be provided as shown.

As may be noted from FIG. 10, retroreflective material 90 is substantially similar to retroreflective material 80 but the layer provided with the retroreflective surface is not the top layer as in retroreflective material 80 but instead is the lower layer as shown. More specifically, retroreflective material 90 may include a top layer of substantially transparent material, such as a suitable transparent thermoplastic film, an intermediate layer of colored adhesive 96, such as a suitable colored pressure sensitive adhesive or a suitable colored heat sensitive adhesive, a lower or bottom layer of suitable material 88, such as a layer of suitable thermoplastic film, whose top surface is provided with a suitable retroreflective surface 94, and if desired, so as to permit the retroreflective material 90 or retroreflective articles of manufacture made therefrom to be adhered to other surfaces, a further layer of suitable pressure sensitive adhesive 97 and a suitable release liner 99 covering the layer of pressure sensitive adhesive also may be provided as shown.

It will be understood that upon the retroreflective materials 80 and 90 including the above-noted thermoplastic films and intermediate colored heat seal or heat sensitive adhesive, such films and adhesives may be the same as described above except that the heat seal or heat sensitive adhesive would, of course, be colored.

Referring now to the retroreflective and colored decorative effect in visible light functions of retroreflective materials 80 and 90 and particularly to retroreflective material 80, it will be understood that upon the opposed portions of layers 82 and 86, indicated by arrows A1 and A2, and A3 and A4 overlying the intermediate colored adhesive 86, being sealed or adhered together by or through the colored adhesive 86, or in alternate consideration upon the portion of the top layer 82 indicated by arrows A1 and A2 and A3 and A4 being sealed or adhered to the lower layer 88 by or through the colored adhesive 86, the colored adhesive engaging the retroreflective surface 84 between such opposed portions will cancel, remove or obliterate the retroreflectivity of the retroreflective surface therebetween whereupon the colored adhesive 86 will be visible upon the retroreflective material 80 being viewed from the top as indicated by arrows R2—R2 and the colored adhesive 86 will provide a colored decorative effect in visible light; the remaining or unsealed or unadhered portion of the retroreflective surface 84 will retroreflect light rays R1 as indicated by arrows A5 and A6. Of course as taught above, upon the layers 82–88 and 92–98 being thermoplastic films, and upon the colored adhesives 86 and 96 being colored heat seal or heat sensitive adhesive, the noted sealing or adhering will be by heat sealing. Similarly, the colored adhesive 96 of retroreflective material 90 of FIG. 10 upon the opposed portions indicated by arrows A1 and A2 and A3 and A4 of the top layer 92 and lower or bottom layer 98 being sealed together through the colored adhesive 96 to cancel, remove, or obliterate the retroreflectivity of the retroreflective material 94 therebetween, the colored adhesive between such opposed portions will be visible through the sealed portion of the top layer 92 and will provide a colored decorative effect in visible light and the unsealed or unadhered portion of the retroreflective surface 94 will continue to retroreflect light as indicated by the arrows A5 and A6. It will be understood that functionally the colored adhesives 86 and 96 of respective retroreflective materials 80 and 90 function to provide a colored decorative effect in visible light as do the colored thermoplastic film 18 and intermediate layer of substantially transparent heat seal adhesive 16 of the retroreflective material 10 of FIG. 1 as illustrated more fully in FIGS. 3–5 and described above.

With regard to the process of manufacture of retroreflective films 80 and 90 in accordance with the teachings of the present invention, it will be understood that upon such retroreflective film being comprised of thermoplastic films and colored heat sensitive adhesives, the manufacturing process for such films will be substantially the same as described above with regard to the manufacturing process for retroreflective material 10, however, the intermediate colored adhesive will, of course, be applied selectively as illustrated in FIGS. 9 and 10 instead of being applied across the entire retroreflective film 10 as shown in FIG. 1. Upon the retroreflective materials 80 and 90 being comprised of pressure sensitive colored adhesives 86 and 96, the manufacturing process will be with pressure as described above without the application of heat.

Figure 11:
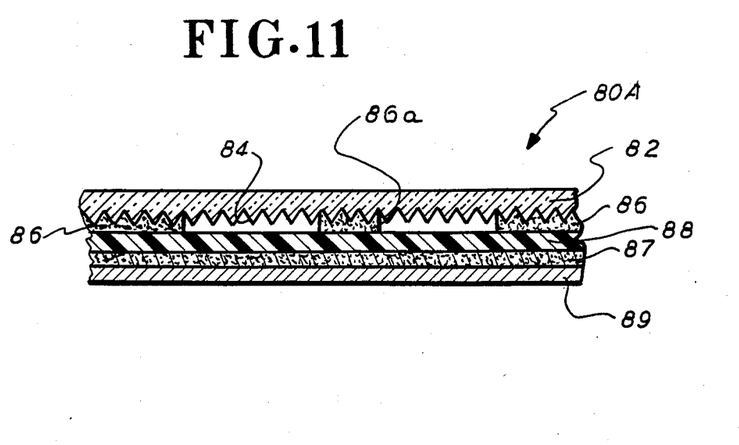
Figure 12:
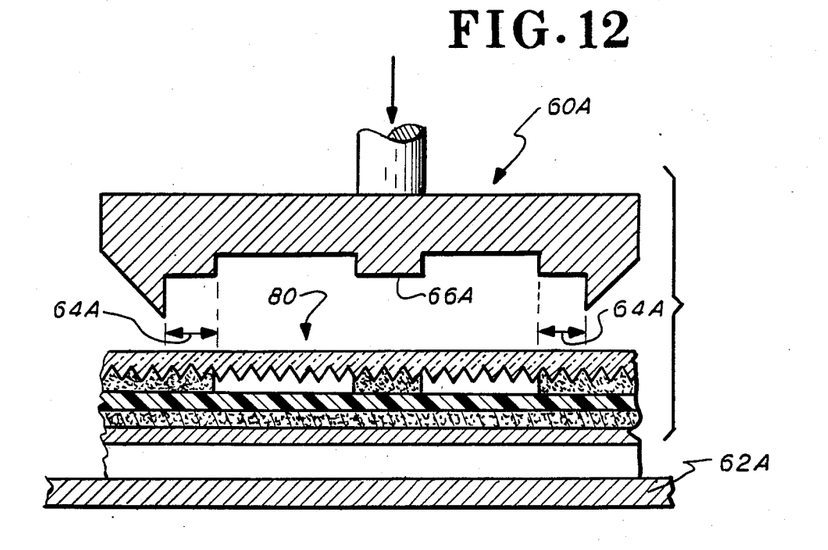
FIG. 12 is a composite view illustrating a process for manufacturing a reflective article of manufacture embodying the present invention.
Figure 13:
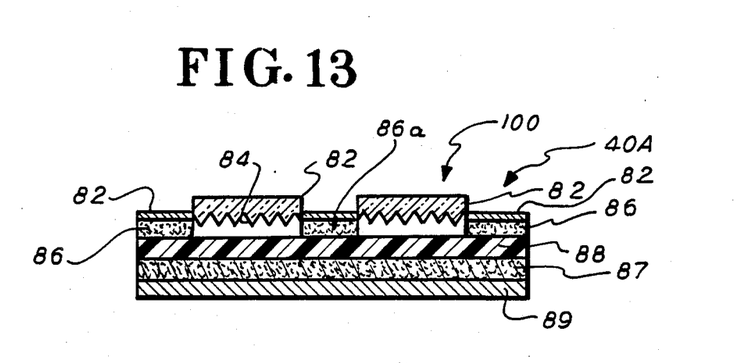
FIG. 13 is a cross-sectional view of a retroreflective article of manufacture embodying the present invention and being similar to FIG. 5.

Referring now to FIGS. 11–13, a further embodiment of the new and improved retroreflective article of manufacture and process of manufacturing the same will be described; in this example, the retroreflective article of manufacture 100 illustrated in FIG. 13 is manufactured from retroreflective material 80A as illustrated in FIG. 11 which is substantially the same as retroreflective film 80 of FIG. 9 described above, but further including intermediate colored adhesive 86A; it will be further understood that the layers 82 and 88 of film 80A are suitable thermoplastic films as described above and the intermediate colored adhesive 86 and 86a are colored heat seal or heat sensitive adhesives as described above.

Referring now to FIG. 12, it will be understood that the thermal die 60a, shown in cross-section, will be shaped such that the thermal die edges 64a, as with thermal die 60 of FIG. 7, are in the shape of the retroreflective article of manufacture 40a of FIG. 13 and retroreflective article of manufacture 40 of FIG. 4, i.e. in the shape of the outline of the figure six (6) and the thermal die 60a will also be provided with an internal member 66a whose face will be in the shape of a circular interior portion 44 of FIG. 4. The thermal die cutting and forming of the retroreflective article of manufacture 40a of FIG. 13, by the process illustrated diagrammatically in FIG. 12, is thereafter the same or substantially the same as the manufacturing process illustrated in FIG. 7 and described above. As illustrated diagrammatically in FIG. 13, the retroreflective article of manufacture 40A, as shown in cross-section, functions with regard to retroreflectivity and the provision of a colored decorative effect in visible light substantially the same as article 40 illustrated in FIGS. 5 and 6, but in the embodiment of 40A illustrated in FIG. 13, the colored decorative effect in visible light is provided by the intermediate colored heat seal or heat sensitive adhesive 86 and 86a being visible through the top layer 82 upon the opposed portions of layers 82 and 86 being heat sealed together through the colored heat sensitive adhesive to cancel the retroreflective surface 84 residing therebetween and to make the colored adhesive visible through the sealed portion of the top layer 82.

Figure 14:
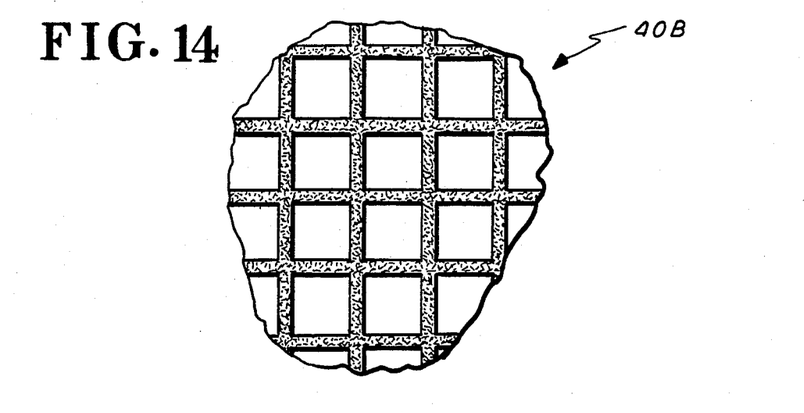
FIG. 14 is a diagrammatical illustration of a top plan view of an alternate embodiment of retroreflective material embodying the present invention.

Instead of providing a colored decorative effect visible in light in the outline of the figure six (6) as illustrated in FIG. 4, including the interior circular portion 44, it will be understood that by suitably shaping the thermal die, such as the thermal dies illustrated in FIGS. 6, 7, 8 and 12 in the shape of other predetermined patterns, such as for example the pattern of rectangles provided by the retroreflective material or article of manufacture 40B illustrated diagrammatically in FIG. 14, and by selectively applying the intermediate colored adhesive in such predetermined patterns between the top and bottom layers of the improved retroreflective film of the present invention, such as films 80 and 90 of FIGS. 9 and 10, respectively, retroreflective films providing colored decorative effects in predetermined patterns may be manufactured. In addition to pluralities of rectangles, as illustrated in FIG. 14, other predetermined patterns such as geometric patterns or patterns in the shape of a plurality of hexagonals, octagonals, triangles, circles, etc., may be provided.

The retroreflective materials and articles of manufacture of the present invention in addition to providing the novel colored decorative effect in visible light described above may be used in applications similar to those of retroreflective materials known to the prior art and may for example be used as signs, may be printed on, etc.

It will be understood by those skilled in the art that many modifications and variations may be made in the present invention without departing from the spirit and the scope thereof.

What is claimed is:

1. A retroreflective article of manufacture providing a colored decorative effect in visible light comprising, in combination, a set of adhesively joined layers comprising:
   a top layer of substantially transparent predetermined material;
   a retroreflective surface disposed beneath said top layer providing retroreflective effects;
   a lower opposed layer of colored predetermined material underlying the top layer;
   wherein said layers are heat sealed together adhesively, the materials forming the colored layer and the top layer causing the retroreflective effects of the retroreflective surface to be cancelled along the edges thus formed by the heat sealing, these edges lying along the periphery and in any desired location intermediate the peripheral edges, making said lower layer of colored predetermined material become visible through said sealed portion of said top layer providing a colored decorative effect in visible light which effectively cancels the retroreflective effects of the retroreflective surface along any edges formed by the heat sealing.

2. Article according to claim 1 wherein said lower opposed layer of colored thermoplastic material comprises substantially transparent heat seal adhesive and an underlying layer of colored plastic film.

3. Article according to claim 2 wherein said top layer and underlying layer of colored film are thermoplastic films heat sealed together through said substantially transparent heat seal adhesive.

4. Article according to claim 1 wherein said lower opposed layer of colored material is provided with a bottom surface covered with a layer of pressure sensitive adhesive covered by a layer of release material.

5. Article according to claim 1 wherein said lower opposed layer of colored predetermined material comprises colored heat seal adhesive.

6. Article according to claim 5 wherein said top and lower layers are thermoplastic films heat sealed together through said colored heat seal adhesive.

7. Article according to claim 1 wherein said retroreflective surface is provided on the lower surface of said top layer.

8. Article according to claim 1 wherein said lower opposed layer of colored predetermined material comprises substantially transparent heat seal adhesive and an underlying layer of colored plastic film and wherein said retroreflective surface is provided on the top surface of said colored film.

9. Article according to claim 1 wherein said lower opposed layer of colored predetermined material comprises colored heat seal adhesive and an underlying layer of plastic film and wherein said retroreflective surface is provided on the top surface of said underlying layer of plastic film.

* * * * *

UNITED STATES PATENT AND TRADEMARK OFFICE
CERTIFICATE OF CORRECTION

PATENT NO. : 4,656,072
DATED : April 7, 1987
INVENTOR(S) : Joseph W. Coburn, Jr. et al.

It is certified that error appears in the above-identified patent and that said Letters Patent are hereby corrected as shown below:

Column 9, line 28, delete "thermoplastic" and insert instead --predetermined--.

Signed and Sealed this

Seventeenth Day of May, 1988

*Attest:*

DONALD J. QUIGG

*Attesting Officer*      *Commissioner of Patents and Trademarks*